US005456288A

United States Patent [19]
Jacobs

[11] Patent Number: 5,456,288
[45] Date of Patent: Oct. 10, 1995

[54] SIMPLEX ORIFICE FITTING WITH SELF-CENTERING PLATE CARRIER

[75] Inventor: James L. Jacobs, Duson, La.

[73] Assignee: Oilfield Production Equipment Co., Inc., Lafayette, La.

[21] Appl. No.: 308,559

[22] Filed: Sep. 19, 1994

[51] Int. Cl.⁶ ..................................................... F15D 1/02
[52] U.S. Cl. ........................................ 138/44; 73/861.61
[58] Field of Search ..................... 138/40, 44; 73/861.61

[56] References Cited

U.S. PATENT DOCUMENTS

| 1,996,192 | 4/1935 | Daniel | 138/44 |
|---|---|---|---|
| 2,050,544 | 8/1936 | Robinson et al. | 138/44 |
| 2,088,968 | 8/1937 | Muff | 138/44 |
| 2,407,951 | 9/1946 | Daniel | 138/44 |
| 4,014,366 | 3/1977 | Critendon | 138/44 |
| 4,422,339 | 12/1983 | Gall | 138/44 |
| 5,042,531 | 8/1991 | Foster | 138/44 |
| 5,094,272 | 3/1992 | Foster | 138/44 |
| 5,181,542 | 1/1993 | Wass et al. | 138/40 |
| 5,186,474 | 2/1993 | Jacobs | 138/44 |
| 5,305,796 | 4/1994 | Klak | 138/44 |
| 5,327,938 | 7/1994 | Crane | 138/44 |

Primary Examiner—David Scherbel
Assistant Examiner—Randall E. Chin
Attorney, Agent, or Firm—Pravel, Hewitt, Kimball & Krieger

[57] ABSTRACT

The simplex orifice fitting includes a housing having a longitudinal bore therethrough and a plate carrier slot intersecting with the longitudinal bore. A plate carrier, having a circular bore, is slidably received in the plate carrier slot. An orifice plate, having a bore therethrough for the passage of fluid, is carried by the plate carrier. A seal ring is positioned around the orifice plate and received within the circular bore of the carrier plate. Centering pins within the housing are connected to the housing and located transverse to the longitudinal bore of the housing. The plurality of centering pins have an end capable of contacting the plate carrier in an operative position. A sealing bar is connected to the plate carrier and springs are positioned between the sealing bar and the plate carrier to permit relative movement therebetween. The springs force the plate carrier into contact with the ends of the centering pins to properly position the plate carrier in the operative position. A clamping assembly secures the sealing bar to the housing with a gasket therebetween. The operative position of the plate carrier is independent of the force applied by the clamping assembly to the sealing bar to effectuate a fluid tight seal between the housing and the sealing bar.

26 Claims, 3 Drawing Sheets

SIMPLEX ORIFICE FITTING WITH SELF-CENTERING PLATE CARRIER

BACKGROUND OF THE INVENTION

1. Field of the Invention

The present invention relates to differential pressure flow instruments for determining the rate of fluid flow through a pipe and more specifically to orifice fittings.

2. Description of the Prior Art

The predominant measurement in the process industry is flow rate. The need for accuracy in the measurement of fluid flow in the process industry is extremely important. A small error in the flow rate measurement of large quantities of fluid through a pipe translates into a potentially huge loss of revenue.

Normally, whenever possible, flow rates are measured with a flat orifice plate which is installed in the pipe carrying the fluid. Typically, the flat orifice plate is housed in an orifice flow meter called an orifice fitting. The orifice plate has a circular bore whose diameter is less than the diameter of the pipe in which it is installed. As Venturi discovered in the late 1700s, fluids gain speed and lose pressure when flowing through a converging section of pipe. Thus, as the fluid converges and accelerates to flow through the smaller bore, it loses pressure. The loss of pressure becomes the differential pressure used to measure the rate of flow.

Many factors affect the accuracy of the readings and determination of the rate of flow using orifice fittings. Standards have been established and adopted by various professional associations. The most popular basis for orifice flow meter design and installation and the accepted standard of orifice flow meter design and installation for the natural gas industry and process industries in the United States and Canada is the American Gas Association (AGA) publication, "Orifice Measurement of Natural Gas, Gas Measurement Committee Report No. 3." The American Petroleum Institute (API) incorporated the AGA publication in its Manual of Petroleum Measurement Standards, Chapter 14— "Natural Gas Fluids Measurement" (hereinafter referred to as "API/AGA 14.3"). Among the many standards established in these publications is the maximum allowable orifice plate bore eccentricity $\Sigma$. The orifice plate bore must be concentric with both the upstream and downstream bore of the orifice fitting, although the eccentricity with respect to the upstream side is the most critical.

FIGS. 1 and 2 show one type of orifice fitting known as a "simplex" orifice fitting, generally designated as F. The simplex orifice fitting F shown in FIGS. 1 and 2 is representative of a typical simplex orifice fitting that is widely used to measure flow rates of fluids in pipelines, particularly in the petrochemical industry. Referring to FIGS. 1 and 2, the simplex orifice fitting F includes a circular, flat orifice plate 10 having a concentrically located bore 12 therethrough. The orifice plate 10 is held in place in a plate carrier 14 by a seal ring 16. The plate carrier 14 is securely mounted to a sealing bar 18 with a pair of bolts 20. A sealing gasket 22 is positioned adjacent to and between the sealing bar 18 and the plate carrier 14. As shown in FIG. 2, it is known in the prior art to include an alignment pin 30 received in opposing blind bores 14a and 18a of the plate carrier 14 and sealing bar 18, respectively. A line-up pin 26 extends upwardly from a sealing face 28 of the orifice fitting F. A line-up hole 18b in the sealing bar 18 is adapted to receive the line-up pin 26 during the installation of the plate carrier 14 into its operative position in the orifice fitting F as shown in FIG. 2.

Referring to FIGS. 1 and 2, the sealing bar 18 is further secured by a clamping bar 34 having a plurality of clamping bolts 36 which forcibly engage the sealing bar 18 into sealing contact with the sealing gasket 22 and the sealing face 28 of the simplex orifice fitting F.

Referring to FIG. 2, the bore 12 of the orifice plate 10 must be concentric or within an allowable eccentricity $\Sigma$ with the longitudinal centerline 32a of the upstream and downstream longitudinal bore 32 (FIG. 1) of the simplex orifice fitting F.

As shown in FIG. 2, the operative position of the orifice plate bore 12 of the simplex orifice fitting F of FIGS. 1 and 2 is determined along the X-axis by the placement of the sealing bar 18 onto the line-up pin 26. The plate carrier 14 is rigidly secured to the sealing bar 18 via the bolts 20 and the alignment pin 30 as shown in FIG. 2. The operative position of the orifice plate bore 12 is determined along the Y-axis by the thickness of the sealing gasket 22 and the amount of compression experienced by the sealing gasket 22 resulting from the force applied by the plurality of clamping bolts 36 in the clamping bar.

It is to be understood that simplex orifice fittings F require routine maintenance and may also require that the orifice plate 10 be replaced with another orifice plate 10 having a bore 12 of different diameter. Replacement of the orifice plate 10 for one with a different size of bore 12 diameter may be required when the fluid flow rate is being changed. When it is desirable to inspect, repair, replace or otherwise service the orifice plate 10, the fluid pressure in the pipe is abated and the plate carrier 14 with the orifice plate 10 and seal ring 16 are manually removed from the simplex orifice fitting F. If the sealing gasket 22 needs replacing, the bolts 20 and the plate carrier 14 are removed from the sealing bar 18 and a new sealing gasket 22 is installed. The plate carrier 14 is manually bolted on to the sealing bar 18 with the sealing gasket 22 therebetween. After performing the necessary repair, replacement or maintenance operations, the assembly is again manually installed in the simplex orifice fitting F and manually tightened down. The final positioning of the orifice plate bore 12 along the X-axis is dependent on the maintained "trueness" of the line-up pin 26, the amount of "play" between the outer diameter of the line-up pin 26 and the inner diameter of the line-up hole 18b, and the "play" between the outer diameter of the alignment pin 30 and the inner diameter of the blind bores 14a and 18a. The final positioning of the orifice plate bore 12 along the Y-axis is dependent on the thickness of the sealing gasket 22 and the amount of compression of the sealing gasket 22 resulting from the torque the technician applies to the plurality of clamping bolts 36 in the clamping bar 34 and also dependent on the amount of compression of the sealing gasket 22 when bolting the plate carrier 14 to the sealing bar 18.

It is desirable to have a simplex orifice fitting which ensures that the orifice plate bore is concentric with or within accepted nominal eccentricities with the longitudinal bore of the simplex orifice fitting. It is also desirable that the simplex orifice fitting maintain nominal eccentricity following repeated plate carrier removal as required to inspect, repair, replace or otherwise service the orifice plate. It is desirable that the simplex orifice fitting be economical and dependable to ensure compliance with the tight tolerances required by API/AGA 14.3. It is further desirable that the simplex orifice fitting be able to repeatedly align the orifice plate bore substantially independent of the technician and external condition of the simplex orifice fitting.

SUMMARY OF THE INVENTION

The present invention provides an improved simplex orifice fitting that is economical, simple, and extremely dependable for insuring that the orifice plate bore is properly aligned in the orifice fitting. The improved simplex orifice fitting ensures proper alignment of the plate carrier in both the X and Y directions of the plate carrier.

The simplex orifice fitting includes a housing having a longitudinal bore therethrough and a plate carrier slot intersecting with the longitudinal bore. A plate carrier, having a circular bore, is slidably received in the plate carrier slot. An orifice plate, having a bore therethrough for the passage of fluid, is carried by the plate carrier. A seal ring is positioned around the orifice plate and received within the circular bore of the carrier plate. A plurality of centering pins within the housing are connected to the housing and located transverse to the longitudinal bore of the housing. The plurality of centering pins have an end capable of contacting the plate carrier in an operative position. A sealing bar is connected to the plate carrier and one or more springs are positioned between the sealing bar and the plate carrier to permit relative movement therebetween. The spring or springs force the plate carrier into contact with the ends of the centering pins to properly position the plate carrier in the operative position. A clamping assembly secures the sealing bar to the housing with a gasket therebetween. The operative position of the plate carrier is independent of the force applied by the clamping assembly to the sealing bar to effectuate a fluid tight seal between the housing and the sealing bar.

The simplex orifice fitting of the present invention ensures repeatability of the operative position of the plate carrier within API/AGA 14.3 by eliminating dependency on an externally mounted line-up pin and the "play" between the outer diameter of the line-up pin and the inner diameter of the line-up hole in the spacer bar. The simplex orifice fitting of the present invention also eliminates the inaccuracies resulting from gasket replacement and the amount of torque applied to the bolts by the technician when servicing the simplex orifice fitting.

BRIEF DESCRIPTION OF THE DRAWINGS

In order to more fully understand the drawings referred to in the Detailed Description of the Present Invention, a brief description of each drawing is presented, in which.

DESCRIPTION OF THE PREFERRED EMBODIMENT

Figure 1:
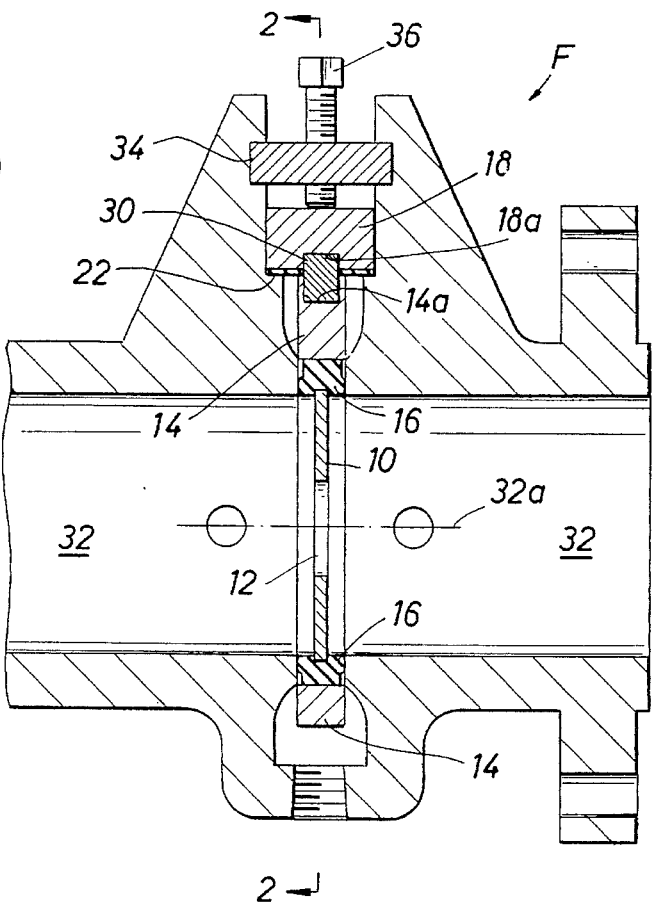
FIG. 1 is an elevational view, taken in cross-section, of a typical simplex orifice fitting known in the prior art.
Figure 2:
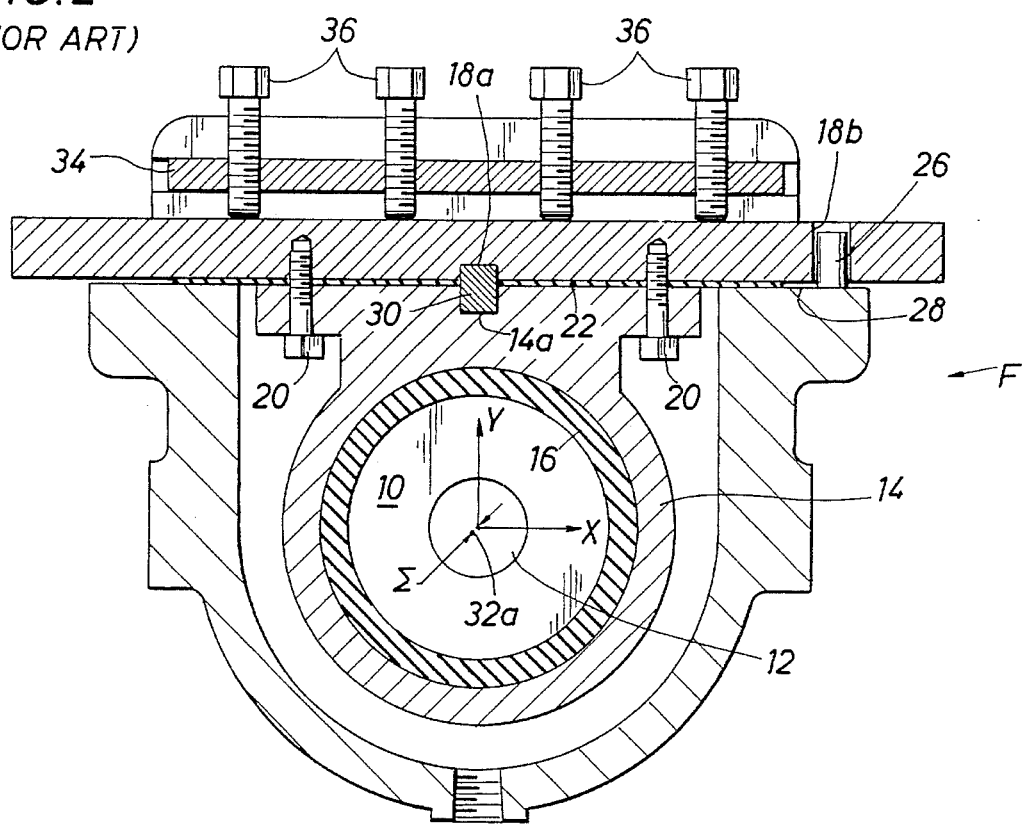
FIG. 2 is a view taken along lines 2—2 of FIG. 1.
Figure 3:
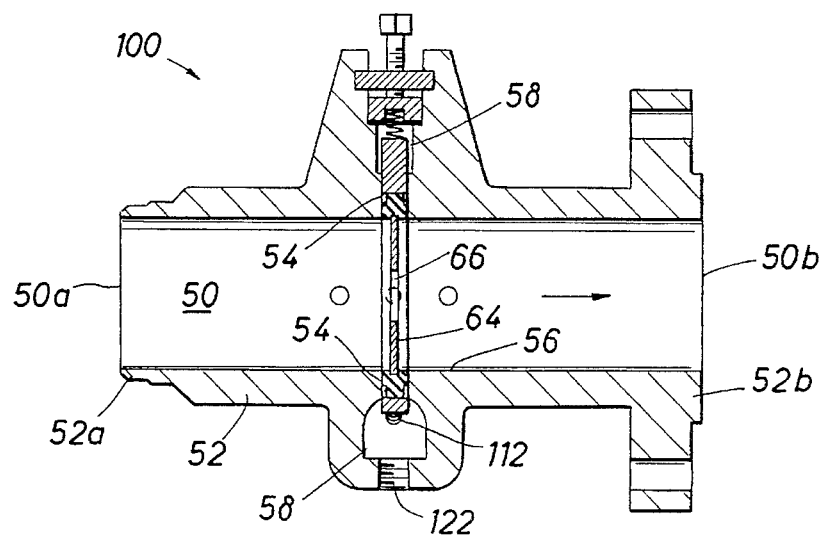
FIG. 3 is an elevational view, taken in cross-section, of the simplex fitting with self-centering plate carrier of the present invention with the orifice plate and plate carrier in an operative position in the simplex orifice fitting.

Referring now to FIG. 3, the simplex orifice fitting with self-centering plate carrier, referred to generally as reference numeral 100, is shown in cross-section having a longitudinal bore 50 extending through a housing 52. The longitudinal bore 50 has a first end 50a and a second end 50b at first and second ends 52a and 52b, respectively, of the housing 52. The first and second housing ends 52a and 52b, respectively, are adapted to be attached or connected to pipe ends (not shown). As shown in FIG. 3, the first housing end 52a is adapted to be weldably secured to a pipe end and the second housing end 52b is adapted to be flange-connected to a flanged pipeline end. It is to be understood that the type of end connection at the first and second housing ends 52a and 52b are contemplated to be any type of connection typical in the industry.

Figure 4:
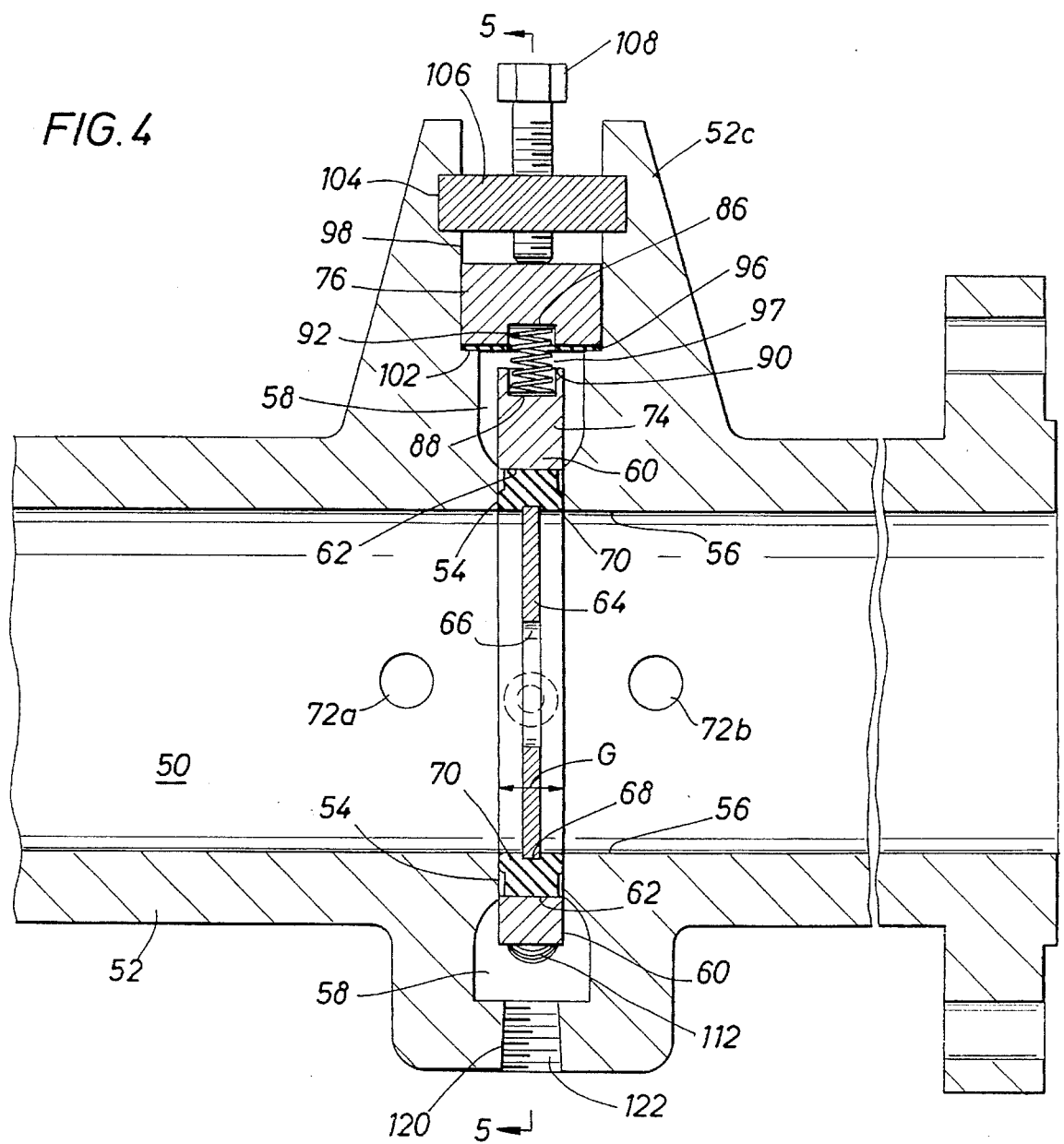
FIG. 4 is a partial enlarged view of the simplex orifice fitting of FIG. 3.

Referring to FIGS. 3 and 4, the simplex orifice fitting 100 includes a plate carrier slot 54 through the wall 56 of the longitudinal bore 50. An annular cavity 58 in communication with the plate carrier slot 54 is formed in the housing 52.

As shown in FIG. 4, a plate carrier 60 includes a circular bore 62 having a diameter greater than the diameter of the longitudinal bore 50. An orifice plate 64 has an orifice plate bore 66 concentrically located in the orifice plate 64. The orifice plate 64 has a circular outer periphery 68 having a diameter which is greater than the inside diameter of the longitudinal bore 50 but less than the diameter of the circular bore 62 of the plate carrier 60. The outer periphery 68 of the orifice place 64 is received by a seal ring 70 as shown in FIG. 4.

As is well known in the art, the centrally-located orifice plate bore 66 creates a pressure differential or drop as the fluid passes therethrough. The pressure differential is sensed by conventional measuring instruments (not shown) connected to the simplex orifice fitting 100 through the tap holes 72a and 72b formed in the housing bore wall 56 on opposite sides of the orifice plate 64.

Figure 5:
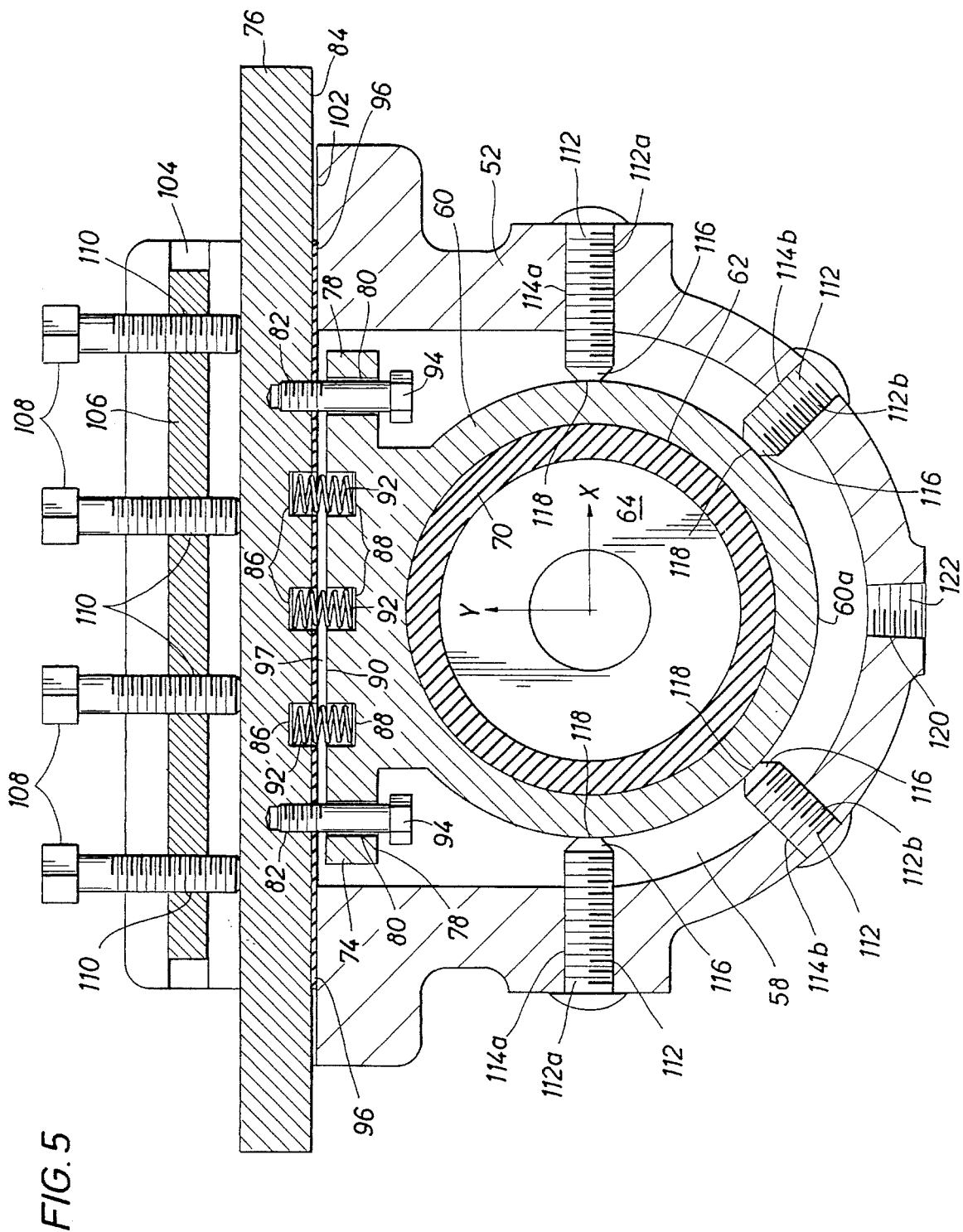
FIG. 5 is a view taken along lines 5—5 of FIG. 4.

Referring to FIG. 4, the plate carrier 60 includes an upper mounting portion 74 for mounting the plate carrier 60 to a sealing bar 76. The sealing bar 76 is a generally flat, elongate rectangular bar as shown in FIGS. 4 and 5. As shown in FIG. 5, the mounting portion 74 of the plate carrier 60 includes a pair of ears 78 having a bore 80 extending therethrough. Referring to FIG. 5, a pair of threaded blind bores 82 are located in a lower face 84 of the sealing bar 76.

Referring to FIGS. 4 and 5, the lower face 84 of the sealing bar 76 includes one or more circular recesses 86 in the lower face 84. A corresponding number of oppositely positioned circular recesses 88 are formed in an upper face 90 of the mounting portion 74. A spring 92 is positioned and confined in each pair of opposing circular recesses 86 and 88. It is to be understood that if a single spring 92 is used, it should be located at the midpoint of the upper face 90. A pair of threaded fasteners 94, such as bolts, extend through the bores 80 in the ears 78 of the mounting portion 74 and threadably engage the threaded blind bores 82 of the sealing bar 76.

As shown in FIGS. 4 and 5, a substantially flat, rectangular gasket 96 is positioned between the lower face 84 of the sealing bar 76 and the upper face 90 of the mounting portion 74 of the plate carrier 60.

It is important to understand that a small gap 97 is maintained between the upper face 90 of the mounting portion 74 and the gasket 96 when the threaded fasteners 94 secure the plate carrier 60 to the sealing bar 76 for reasons which will be explained below.

Referring to FIG. 4, the housing 52 includes a sealing bar slot 98 formed therethrough at an upper housing portion 52c extending transversely to the longitudinal bore 50. The sealing bar slot 98 includes a lower sealing surface 102. As shown in FIG. 4, the sealing bar slot 98 is adapted to receive the sealing bar 76 and sealing gasket 96.

A clamping bar slot 104 is slightly wider than the sealing bar slot 98 and is formed above the sealing bar slot 98 for receiving a clamping bar 106. Referring to FIG. 5, a plurality of threaded fasteners 108 extend through the clamping bar 106 via threaded throughbores 110.

Referring to FIG. 5, a plurality of centering screws or pins 112 are mounted in the housing 52 to center and position the plate carrier 60 in the proper operative position within the simplex orifice fitting 100. The centering screws 112 extend into annular cavity 58. As shown in FIG. 5, a first pair 112a and a second pair 112b of centering screws 112 are received in pairs of threaded bores 114a and 114b, respectively, located transverse to the longitudinal bore 50 of the housing 52. Preferably, the centering screws 112 are securely connected to the housing 52, as for example by welding. In the preferred embodiment, each centering screw 112 has a frustoconical end 116 which is capable of contacting the plate carrier 60 in the operative position. Preferably, the plate carrier 60 has a circular outer portion 60a and each centering screw 112 has a contoured end face 118 which corresponds with the circular outer portion 60a as shown in FIG. 5. In the preferred embodiment, the circular outer portion 60a is concentric with the circular bore 62 of the plate carrier 60.

Due to the very tight tolerances imposed by API/AGA 14.3, in the preferred embodiment, the pair of centering screws 112a are positioned slightly below the horizontal or X-axis centerline of the longitudinal bore 50 as shown in FIG. 5. This positioning of the pair of centering screws 112a permits the contoured end face 118 to be trimmed to extremely tight tolerances while permitting the plate carrier 60 to slide in the plate carrier slot 54 until coming to rest against the contoured end faces 118 of the centering screws 112.

For example, with a sealing area gap G as shown in FIG. 4 of 0.563", ½" diameter centering screws 112 may be used for added strength and rigidity. Preferably, the contoured end face 118 at the frustoconical end 116 has a diameter of approximately ¼". Thus, the centerline of the pair of centering screws 112a would be at least ⅛" below the X-axis centerline of the longitudinal bore 50. This will ensure that the uppermost edges of the contoured end faces 118 of the centering pins 112a will permit the plate carrier 60 to pass until contacting all of the contoured end faces 118.

Referring to FIGS. 4 and 5, the housing 52 includes a threaded bore 120 and a drain plug 122 for draining fluid from the simplex orifice fitting 100.

In the assembly of the simplex orifice fitting 100 of the present invention, the centering screws 112 are initially threaded into the threaded bores 114a and 114b. The plate carrier assembly comprising the plate carrier 60, orifice plate 64 and seal ring 70 are inserted into the plate carrier slot 54. The plate carrier assembly is initially centered in the longitudinal bore 50 of the simplex orifice fitting 100. The initial centering of the plate carrier assembly with the centering screws 112 can be accomplished with an orifice eccentricity measurement tool as disclosed in U.S. patent application Ser. No. 898,031. With the initial centering complete, the plate carrier assembly is removed from the housing 52 and the centering screws 112 are fully welded to the housing 52 to prevent any fluid leakage or movement of the centering screws 112. The welding of the centering screws 112 results in slight inward movement of the centering screws 112 due to the "play" in the threaded connection. The slight inward movement of the centering screws 112 resulting from the welding process allows for slight trimming of the end faces 118 of the centering screws 112. A cutting tool is inserted into the longitudinal bore 50 of the housing 52 and centered or made "true" with the longitudinal bore 50. The cutting tool is adjusted to trim the end faces 118 by passing through an arc equal to the circular outer portion 60a of the plate carrier 60 while true with the longitudinal centerline of the longitudinal bore 50. This results in a "perfect fit" between the contoured end faces 118 and the circular outer portion 60a of the plate carrier 60.

In the operation of the present invention, the plate carrier assembly is mounted to the sealing bar 76 with the sealing gasket 96 therebetween. A typical sealing gasket 96 has a thickness of approximately 0.062". The spring or springs 92 are under a small amount of initial compression to force the plate carrier 60 away from the sealing bar 76. The plate carrier 60 is restrained from further movement away from the sealing bar 76 by the heads of the bolts 94. A small amount of movement in the X-axis direction of the plate carrier 60 relative to the sealing bar 76 is permitted due to the amount of "play" or difference between the diameter of the bores 80 and the diameter of the bolts 94 as shown in FIG. 5. As the plate carrier assembly is inserted into the plate carrier slot 54, the seal ring 70 frictionally engages the plate carrier slot 54 in the sealing area gap G. The spring or springs 92 provide sufficient spring force or compressive resistance to maintain or at least substantially maintain the gap 97 between the plate carrier 60 and the sealing bar 76 without further compression of the spring or springs 92. This ensures that the plate carrier 60 finally "bottoms out" against the centering screws 112 and overcomes the frictional resistance of the seal ring 70 prior to further compression of the spring or springs 92. It is to be understood that slight movement of the plate carrier 60 in the X-axis direction relative to the sealing bar 76 can occur if the plate carrier 60 is not perfectly aligned as it is being inserted into the plate carrier slot 54 as a result of the oversizing of the holes 80 relative to the bolts 94.

With the plate carrier 60 resting against the centering screws 112, the sealing bar 76 and the sealing gasket 96 are above the sealing surface 102 of the sealing bar slot 98. The clamping bar 106 is slid into the clamping bar slot 104 until it is substantially centered above the plate carrier 60. The plurality of threaded fasteners 108 are tightened against the sealing bar 76 which causes further compression of the spring or springs 92. The threaded fasteners 108 are tightened to effectuate the fluid tight seal between the sealing bar 76 and the housing 52 with the sealing gasket 96 therebetween. As shown in FIGS. 4 and 5, the spring or springs 92 are not fully compressed when the seal between the sealing bar 76 and the sealing surface 102 has been effectuated.

It is to be understood that the operative position of the orifice plate 64 and plate carrier 60 is independent of the amount of torque applied to the threaded fasteners 108. The spring or springs 92 force the plate carrier 60 into contact with the ends 116 of the centering screws or pins 112 in the operative position. It is also understood that the compression and thickness of the sealing gasket 96 will not effect the operative position of the orifice plate 64 and the plate carrier 60 within certain limits. For example, the typical sealing gasket 96 has a thickness of approximately 0.062". If a sealing gasket 96 is used having a thickness of 0.125", the operative position of the plate carrier 60 will not be affected since the plate carrier 60 is designed to first bottom out against the centering screws 112 with the spring or springs 92 further compressing to reduce the gap 97 as the sealing bar 76 is clamped into sealing engagement with the housing 52. Sealing gaskets of lesser thickness can also be used without affecting the operative position of the plate carrier 60.

The foregoing disclosure and description of the invention is illustrative and explanatory thereof, and various changes in the size, shape, and materials, as well as in the details of illustrative construction and assembly, may be made without departing from the spirit of the invention.

I claim:

1. A simplex orifice fitting for connecting into a pipeline for determining a pipeline fluid rate of flow, the simplex orifice fitting comprising:

a housing having a longitudinal bore therethrough and a plate carrier slot intersecting with the longitudinal bore;

a plate carrier having a circular bore, said plate carrier is slidably received in the plate carrier slot;

an orifice plate having a bore therethrough for the passage of fluid, said orifice plate is carried by said plate carrier;

a seal ring positioned around said orifice plate and received within the circular bore of said plate carrier;

means for positioning said plate carrier in an operative position in said housing, said positioning means located within said housing;

a sealing bar connected to said plate carrier;

a fastening member directly connecting said sealing bar to said plate carrier; and spring means between said sealing bar and said plate carrier to permit relative movement therebetween.

2. The simplex orifice fitting of claim 1, wherein said positioning means comprises a plurality of centering pins connected to said housing and located transverse to the longitudinal bore of said housing, said plurality of centering pins having an end contacting said plate carrier.

3. The simplex orifice fitting of claim 2, wherein said plate carrier has a circular outer portion and said ends of said centering pins is contoured to correspond with said circular outer portion.

4. The simplex orifice fitting of claim 2, wherein said spring means forces said plate carrier into contact with said ends of said centering pins in the operative position.

5. The simplex orifice fitting of claim 1, further comprising:

clamping means for securing said sealing bar to said housing;

said housing including a sealing surface; and a sealing gasket positioned between said sealing surface and said sealing bar.

6. The simplex orifice fitting of claim 5, wherein the operative position of said plate carrier is independent of the force applied by said clamping means to said sealing bar to effectuate a fluid tight seal between said housing and said sealing bar.

7. The simplex orifice fitting of claim 1, wherein said spring means maintains an unobstructed gap between said plate carrier and said sealing bar.

8. The simplex orifice fitting of claim 1, wherein said spring means includes two or more springs.

9. In a simplex orifice fitting for connecting into a pipeline, the simplex orifice fitting having a housing with a longitudinal bore therethrough, a plate carrier slot intersecting the longitudinal bore, and an annular cavity in communication with the plate carrier slot, a plate carrier received in the plate carrier slot, an orifice plate with an orifice plate bore located in the longitudinal bore within the plate carrier, a sealing bar connected to the plate carrier with a fastening member and a clamping assembly for sealing the sealing bar to the housing, the improvement comprising:

means for positioning the plate carrier in an operative position in the housing, said positioning means located within the housing and extending within the annular cavity.

10. The simplex orifice fitting of claim 9, wherein said positioning means comprises a plurality of centering pins connected to the housing and located transverse to the longitudinal bore of the housing, said plurality of centering pins having an end contacting the plate carrier.

11. The simplex orifice fitting of claim 10, wherein the plate carrier has a circular outer portion and said ends of said centering pins is contoured to correspond with said circular outer portion.

12. The simplex orifice fitting of claim 9, wherein the operative position of the plate carrier is independent of the force applied by the clamping assembly to the sealing bar to effectuate a fluid tight seal between the housing and the sealing bar.

13. The simplex orifice fitting of claim 9, further comprising spring means between the sealing bar and the plate carrier to permit relative movement therebetween.

14. The simplex orifice fitting of claim 13, wherein said spring means maintains an unobstructed gap between the plate carrier and the sealing bar in the operative position.

15. The simplex orifice fitting of claim 13, wherein said spring means includes one or more springs.

16. The simplex orifice fitting of claim 13, wherein said spring means forces the plate carrier into contact with said positioning means in the operative position.

17. An orifice fitting comprising:

a housing having a longitudinal bore therethrough;

a plate carrier assembly slidably received in said housing; and a sealing bar fastened to said plate carrier assembly, wherein said sealing bar is spring-mounted to said plate carrier assembly to permit limited relative movement therebetween.

18. The orifice fitting of claim 17, further comprising a spring member positioned between said sealing bar and said plate carrier assembly.

19. The orifice fitting of claim 18, wherein said spring member maintains an unobstructed gap between said plate carrier assembly and said sealing bar.

20. The orifice fitting of claim 17, further comprising a fastening member directly connecting said sealing bar to said plate carrier assembly.

21. The orifice fitting of claim 17, further comprising means for positioning said plate carrier assembly in an operative position in said housing.

22. The orifice fitting of claim 21, wherein said positioning means comprises a plurality of centering pins connected to said housing and located transverse to the longitudinal bore of said housing, said plurality of centering pins having an end contacting said plate carrier assembly.

23. The orifice fitting of claim 22, wherein said plate carrier assembly has a circular outer portion and said ends of said centering pins is contoured to correspond with said circular outer portion.

24. The orifice fitting of claim 22, wherein said spring member forces said plate carrier assembly into contact with said ends of said centering pins in the operative position.

25. The orifice fitting of claim 21, further comprising:

clamping means for securing said sealing bar to said housing;

said housing including a sealing surface; and a sealing gasket positioned between said sealing surface and said sealing bar.

26. The orifice fitting of claim 25, wherein the operative position of said plate carrier assembly is independent of the force applied by said clamping means to said sealing bar to effectuate a fluid tight seal between said housing and said sealing bar.

* * * * *